Feb. 14, 1967 F. M. MEDWEDEFF 3,304,422
DENTAL X-RAY SHIELD AND FILM HOLDING SUPPORT
HAVING A BITE-RECEIVING MEMBER
Filed July 30, 1964 2 Sheets-Sheet 1
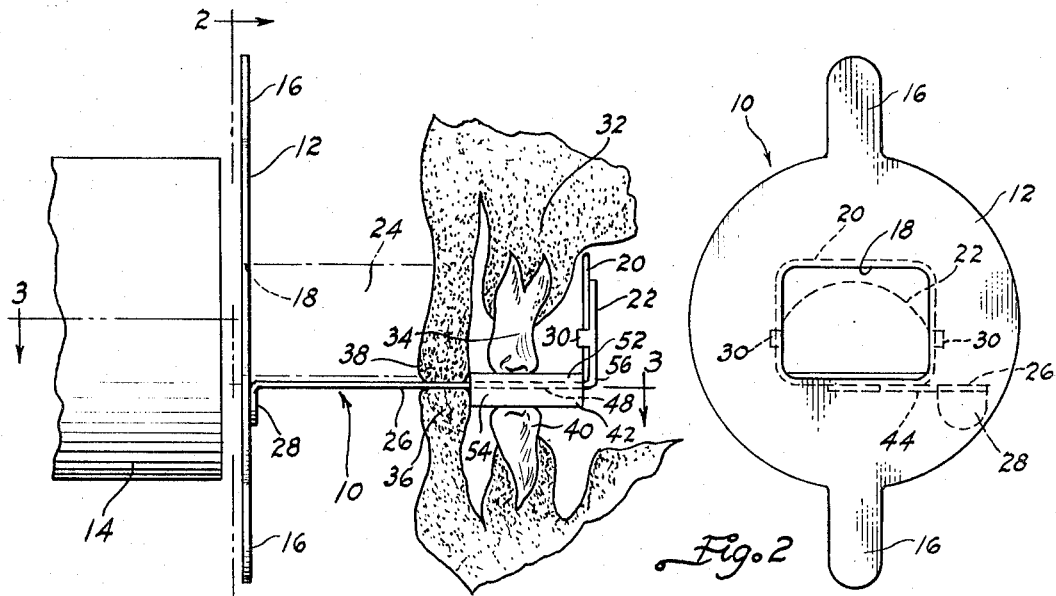
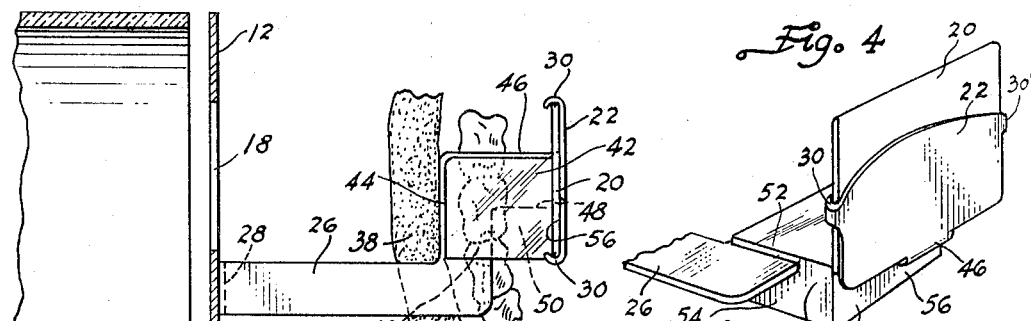
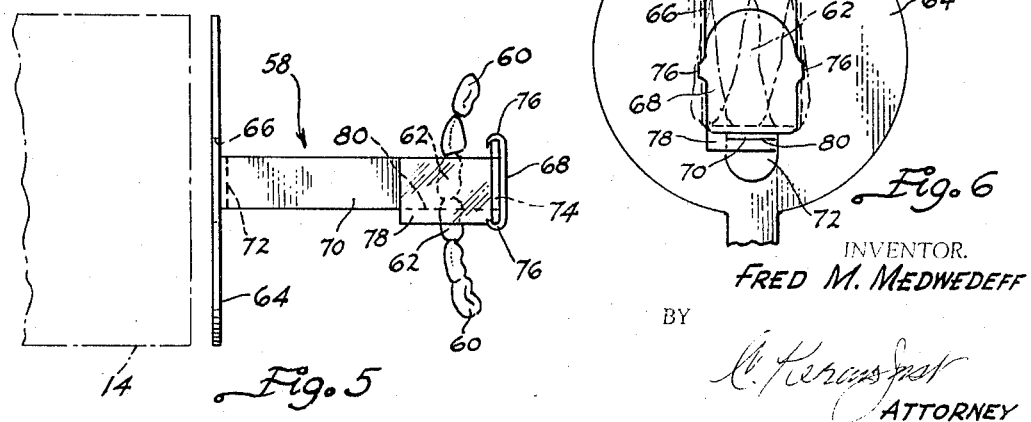
INVENTOR.
FRED M. MEDWEDEFF
BY
ATTORNEY Feb. 14, 1967 F. M. MEDWEDEFF 3,304,422
DENTAL X-RAY SHIELD AND FILM HOLDING SUPPORT
HAVING A BITE-RECEIVING MEMBER
Filed July 30, 1964 2 Sheets-Sheet 2
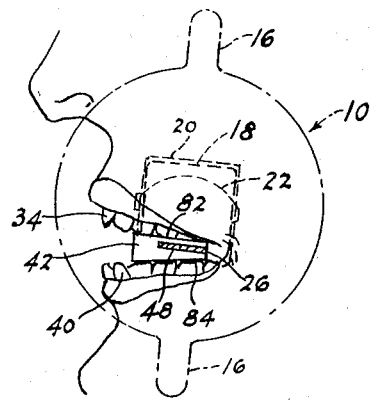
Fig. 7
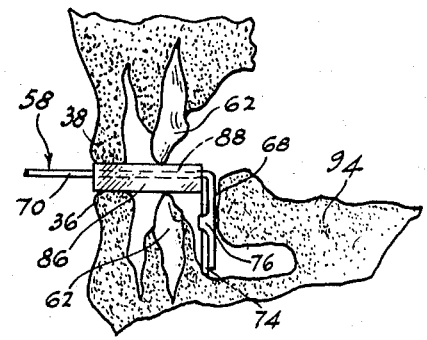
Fig. 8
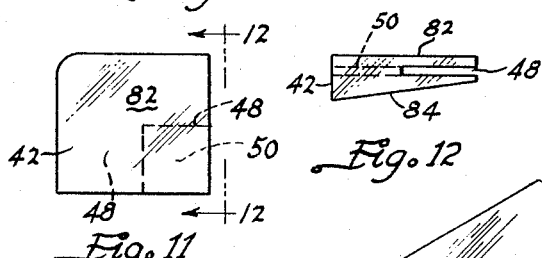
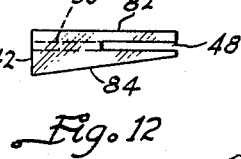
Fig. 12
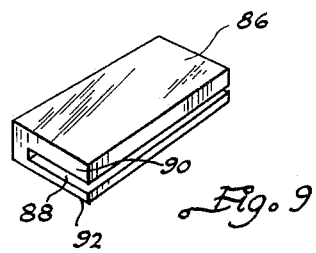
Fig. 9
Fig. 11
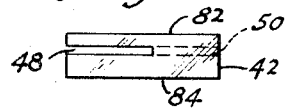
Fig. 13
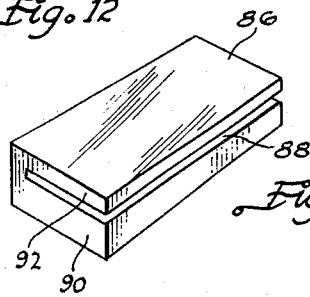
Fig. 10
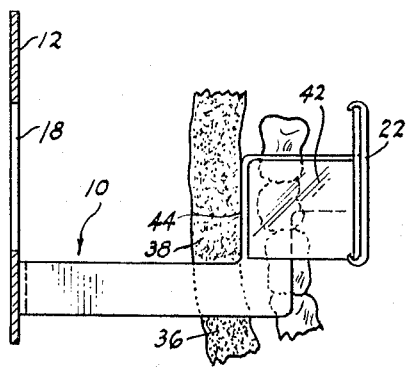
Fig. 14
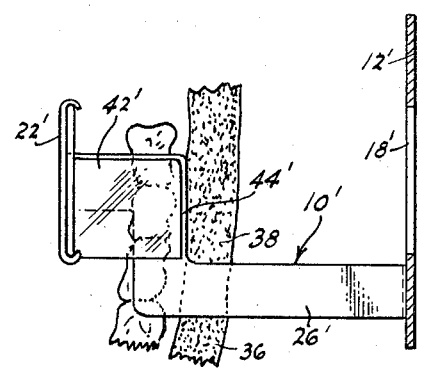
Fig. 15
INVENTOR.
FRED M. MEDWEDEFF
BY
ATTORNEY

United States Patent Office 3,304,422
Patented Feb. 14, 1967

3,304,422
DENTAL X-RAY SHIELD AND FILM HOLDING SUPPORT HAVING A BITE-RECEIVING MEMBER
Fred M. Medwedeff, Nashville, Tenn., assignor to Precision X-ray Company, North Nashville, Tenn.
Filed July 30, 1964, Ser. No. 386,205
5 Claims. (Cl. 250—70)

This invention pertains to an X-ray shield employed in the taking of dental X-rays and also includes means for holding a film in operative position with respect to teeth that are being X-rayed. The shield also has means which renders it useful in aiming the cone of an X-ray machine relative to the film held within the intra-oral cavity by the film holder portion of the invention.

The X-ray shield and holder for film comprising the present invention includes certain improvements over the X-ray film holder and aiming element comprising the subject matter of Patent No. 3,092,721, issued June 4, 1963, in which the applicant is one of the co-inventors in said patent, said patent now being in process of being reissued.

Whereas the several embodiments of the X-ray shield and film holder structures of the aforementioned patent were adapted to hold film of the bitewing type and also the types of film usually employed for periapical types of X-rays, the present invention primarily is adapted to the holding of film for taking X-ray exposures of the periapical type in which substantially the entire tooth is filmed, from the occlusal or incisal portion thereof to the inner ends of the roots.

In said prior patent, the types of film holder and aiming elements shown therein for the taking of periapical X-rays employed a shield member arranged to be positioned exteriorly of the face of a patient, a rigid bracket arm extending rearwardly from the shield member, and a film holder rigidly connected to the opposite end of the bracket arm. In positioning the film holder and aiming element operatively, the bracket arm was disposed between the teeth of the opposite jaws of a patient and the occlusal surfaces or incisal edges of the teeth were brought into engagement with opposite sides of said bracket arm. Due to the fact that the preferred form of the bracket arm was of a metallic nature which rendered it rigid, the direct engagement thereof by the teeth of the patient has offered certain objections, particularly in regard to comfort to the patient and lack of apprehension of the patient relative to gripping a non-yieldable metallic object between the patient's teeth and inability to grip the arm without slippage occurring.

Another objection is the fact that the direct engagement of a metal object with the occlusal surface or incisal edge of a tooth sometimes interferes with the obtaining of an accurate exposure of the occlusal surface or incisal edge upon the X-ray film, whereby the X-ray pictures are not satisfactory to the dentist.

In view of the foregoing difficulties encountered in using the structure of said prior patent, which nevertheless do not detract from the basic, fundamental concepts of the invention covered by said patent, it is the principal object of the present invention to overcome said difficulty primarily through the employment of bite-receiving means which preferably are detachably connected to the bracket arm of the X-ray shield and film holder comprising the present invention, said means being non-metallic and, in the preferred construction thereof, being yieldable at least to a limited extent with respect to the direct engagement thereof by the teeth of the opposing jaws of a patient.

Another object of the invention is to make the bite-receiving means in the form of a block which can be fabricated inexpensively from appropriate forms of synthetic resins, commonly referred to as plastics and a number of forms of which are obtainable in cellular form so as to be highly suitable for the intended purpose, while other forms are suitably yieldable such as polystyrene. It is to be understood however that the specific mentioning of said types of plastics are not to be regarded as restrictive but, rather, merely as illustrative of the fact that said bite blocks can be manufactured inexpensively and therefore readily can be expended atfer each use, thereby permitting the shield members, bracket arm, and film holder of the X-ray shield and film holder comprising the present invention to be manufactured from metal, such as stainless steel, which readily can be sterilized by autoclaving, or otherwise, including the use of so-called cold sterilizing preparations.

A further object of the invention is to arrange the engagement of the bite-receiving blocks detachably upon the bracket arms of the several embodiments of X-ray shield and film holder units of the present invention in such manner that said blocks comprise stop means engageable by the X-ray film incident to positioning the same in the film holder means of said unit.

Still another object of the invention is to provide said bite-receiving blocks with suitable slots readily and frictionally receiving the bracket arm of the unit so as to position the blocks in operative position upon the bracket arms of the various embodiments of the invention.

A still further object of the invention is to provide expendable and readily replaceable bite-receiving blocks which are wedge-shaped in side elevation so to insure parallel engagement of the opposing rows of teeth of the opposite jaws of a patient respectively with the upper and lower surfaces of the block notwithstanding the fact that when the jaws are partially open, the line of occlusal surfaces of the opposing posterior teeth of a patient are disposed at an acute angle to each other.

Still another object of the invention is to provide bracket arms in such X-ray shield and film holder units having a lateral offset therein adjacent the film holder of said unit to permit comfort to the patient while X-raying the innermost molar teeth without distorting the side of the mouth unduly and, incident to employing bite-receiving blocks on such offset types of bracket arms, said blocks are constructed with slots which accommodate at least portions of the offset arms and utilize the construction to accurately position the blocks relative to said arms in use.

Still other objects of the invention are to provide bite-receiving blocks of appreciable length to accommodate the X-ray shield and film holder to the X-raying of teeth in intra-oral cavities having palates of various depths. For the purpose of further adapting the invention to different depths of palates especially in regard to the taking of X-rays of anterior teeth, certain embodiments of the bite-receiving blocks of the present invention have an arm-receiving slot which is disposed closer to one of the teeth-engageable surfaces of the block than the other, whereby relatively thick and thin portions are provided upon said block which may be disposed either uppermost or lowermost with regard to the bracket arm received in the slot of the block, as required by the depth of the palate of a particular patient.

Details of the foregoing objects and of the invention, as well as other objects thereof, are set forth in the following specification and illustrated in the accompanying drawings comprising a part thereof.

In the drawings:

FIG. 1 is a fragmentary side elevation of a combination X-ray shield and film holder embodying the principles of the present invention and positioned relative to a fragmentarily illustrated, vertical section of one side of a patient's face and supported in operative position by bite-receiving means engaged between opposing teeth of the patient in accordance with the principles of the invention.

FIG. 2 is a front view of the X-ray shield and film holder unit shown in FIG. 1 as seen on the line 2—2 of FIG. 1.

FIG. 3 is a horizontal sectional view of the structure and anatomy shown in FIG. 1 as seen on the line 3—3 of said figure.

FIG. 4 is a perspective view of the film holder and a fragmentary perspective view of the bracket arm of the X-ray shield and film holder unit as seen somewhat from the lower right-hand corner of FIG. 3 and showing one embodiment of bite-receiving block arranged in operative position upon the bracket arm.

FIG. 5 is a top plan view of another embodiment of X-ray unit embodying the principles of the present invention and shown disposed in exemplary position with respect to a row of teeth of a patient.

FIG. 6 is a rear elevation of the X-ray shield and film holder shown in FIG. 5 as seen from the right-hand end of FIG. 5, portions of the holding ears of the X-ray shield being eliminated to adapt the view to the sheet.

FIG. 7 is a side elevation of a fragmentary portion of opposing jaws of an exemplary patient illustrating still another embodiment of bite-receiving means disposed between the occlusal surfaces of the teeth of opposing jaws, there also being illustrated in phantom an X-ray shield and film holder associated with the bracket arm shown in sectional view with respect to the bite-receiving block shown in said figure.

FIG. 8 is a fragmentary view showing a portion of the anatomy similar to that illustrated in FIG. 1 but in relation to a fragmentarily illustrated portion of still another embodiment of bite-receiving block and film holder comprising the principles of the present invention.

FIGS. 9 and 10 are perspective views of the embodiment of bite-receiving block illustrated in FIG. 8 and respectively showing the thickest portion of the block uppermost and the thinnest portion of said block uppermost.

FIG. 11 is a top plan view of the embodiment of bite-receiving block contemplated for use in relation to a bracket arm having an offset portion of the type shown in plan view in FIG. 3 but in which the upper and lower surfaces thereof are disposed in angular relationship with respect to each other.

FIG. 12 is a side view of the bite-receiving block embodiment shown in FIG. 11 as seen on the line 12—12 of said figure and illustrating the angular relationship of the lower surface with respect to the upper surface of said block.

FIG. 13 is a side view of the bite-receiving block shown in FIG. 11 as viewed from the lowermost edge of the block in FIG. 11.

FIGS. 14 and 15 respectively are horizontal sectional views similar to FIG. 3 and illustrating in exemplary manner respectively right-hand and left-hand versions of the embodiment of X-ray shield and film holder having offset means in the bracket arms thereof and intended particularly for X-raying posterior teeth without undue discomfort to the patient.

The dental X-ray shield of the present invention is intended for use in conjunction with either the nose of a long cone X-ray machine or the nose of an open end short cone or pointed short cone X-ray machine. Primarily, the shield is for purposes fo directing the effective X-rays upon the teeth or jaw portions intended to be X-rayed. In accordance with the proposed and intended technique, the shield absorbs and, therefore, prevents X-rays of the primary beam from contacting any human tissue not intended to be X-rayed. Therefore, the only X-rays which actually contact the tissues, bone or tooth structures intended to be X-rayed are those which are intentionally permitted to pass through an opening of desired size and shape, arranged preferably centrally of the shield member and extending therethrough, said opening being substantially of an area which either is coextensive with or slightly smaller in shape and size than the X-ray film used in conjunction with the shield and film holder of the unit comprising the present invention.

As a result of using an X-ray shield of the type provided by the present invention, possible injury to the patient from scattered and surplus primary X-rays is greatly minimized. If no such X-ray shield of the type provided by this invention is utilized incident to taking X-rays of teeth and adjacent anatomical portions, and as currently experienced in conventional X-ray techniques, patients frequently sustain undue exposure by X-rays to critical organs of the anatomy, particularly in young children, such as the patient's thyroid, pituitary, tongue, brain and eyes because the tissues of these frequently are in the path of the primary beam when employing such conventional X-ray techniques.

The foregoing possibilities of danger are particularly prevelant in regard to exposing young children to dental X-ray techniques as presently practiced without the aid of any appropriate shield means to prevent the above-mentioned organs of the human head from being subjected to the primary beam of X-rays. Cognizance of this is all the more necessary when it is considered that, in the average human lifetime, a patient is subjected much more extensively to X-rays applied in dental practice than from any other source. Hence, the minimizing of danger from undue exposure by X-rays administered in dental techniques is one of the primary objectives of the present invention.

To effect such minimum possibility of danger from over-exposure of primary or even random X-rays through the exposure of various portions of the head of a patient to the same, the X-ray shield and film holder comprising the subject matter of prior Patent No. 3,091,721 was developed and the present invention includes X-ray shield means very similar to those employed in the various embodiments illustrated and described in said prior patent. shield means of such type are highly effective to absorb all but a negligible amount of the scattered and surplus primary X-rays through the use of a metallic shield of such area that it extends, preferably, entirely across either long or short cones and either a blunt or pointed nose cone of dental X-ray machines. The central portion of said shield has in it an opening which, by specific design, is only of such area and shape as to conform substantially to the confines of an X-ray film supported in operative position relative to said shield and particularly the opening therein, whereby effective and desired X-rays only pass through the opening of said shield for application to the film and, as indicated, the relationship of the shape and size of the opening with respect to the film is such that no appreciable excess quantity of X-ray films contact any appreciable amount of tissue not desired to be subjected to the required X-rays.

As indicated above, in addition to the use of such X-ray shield means however, the present invention additionally contemplates the use of a number of different embodiments of bite-receiving means, preferably in different shapes and sizes of block formations or configurations, generically referred to hereinafter as bite blocks. Preferably, such blocks are manufactured from relatively inexpensive material such as a number of different types of synthetic resins, commonly referred to as plastics. The preferred types of material are those which afford a certain amount of cushioning action through inherent yieldability of the material of which two general types are available. One of these types is of a cellular nature and is somewhat spongy, one variety being sold under the trade name "Etho-Cel." Another type is a variety of plastics which are somewhat rubbery and yieldable by nature, of which polyethylene is a well known representative.

In the design of X-ray shields and film holders embodied in said aforementioned prior patent, a rigid, preferably metallic bracket arm extended between the shield member and the film holder. To position the unit operatively with respect to the intraoral cavity of a patient, the film holder was disposed within said cavity, thereby necessitating the positioning of the metallic bracket arm between the opposing teeth of the jaws of a patient. Many individuals find that it is decidedly uncomfortable to grip a hard metallic object between their teeth. Under some circumstances, depending upon whether the bite occurs violently and accidentally, it is possible to damage teeth when clamping such metallic bracket arm between the teeth of opposing jaws. Thus, by employing suitable bite blocks of various embodiments of the general nature referred to above for use with the bracket arms of X-ray shield and film holder units embodying the principles of the present invention, such discomfort and possibility of damage to teeth within the oral cavity is either minimized or completely obviated.

To more graphically describe the details of the present invention, attention is directed to FIGS. 1 and 2 wherein there is illustrated one embodiment of an X-ray shield and film holder unit 10 comprising a plate-like shield member 12 which, preferably, is planar but is circular in shape as clearly shown in FIG. 2. The diameter of the shield member 12 is such as to be slightly larger than the diameter of the nose cone 14 of an X-ray machine, not shown, only the outermost end portion of the nose cone 14 being illustrated so as to minimize the view. The shield 12 therefore not only serves for shielding purposes but also facilitates the aiming of the cone 14 with respect to the unit 10 and especially the film supported thereby as described in detail hereinafter.

The shield member 12 preferably has a pair of ears or handles 16 projecting radially therefrom to assist in positioning the unit 10 operatively as is further described hereinafter. Preferably, the shield member 12 and ears 16 may be stamped commonly and integrally from a sheet of suitable material such as stainless steel or the like. Also, while the shield member 12 has been shown as being formed from a single thickness of sheet material, the same could be fabricated such as by devising from a sheet of lead or lead alloy of appropriate thickness and providing suitable stiffening or support means therefor.

Disposed preferably centrally of the shield member 12 is an opening 18 which, in the various embodiments illustrated in the drawings, is substantially rectangular in shape due primarily to the fact that X-ray film presently available is provided in rectangular shape. Essentially however, the shape and size of the opening 18 is intended to conform in general to the size and shape of the X-ray film 20 which is illustrated more or less in exemplary manner in the various figures and especially in FIG. 1, wherein it is supported by a film holder 22 so as to be substantially parallel to the shield member 12 and in axial alignment with the opening 18, whereas the desired concentration of beamed X-rays is illustrated as a column 24 thereof defined by spaced parallel broken lines clearly shown in FIG. 1.

Film holder 22 preferably is formed from suitable sheet metal such as stainless steel or any other metal which preferably is corrosion-resistant, as is also the bracket arm 26 which may be stamped from the same sheet metal as film holder 22 so as to be integral therewith. The film holder 22 is bent at a right angle to the bracket arm 26 and the forward end of the latter is provided with an attaching ear 28 which is connected to the shield member 12 by any appropriate means such as spot welding or the like. The film holder 22 also is provided at opposite sides thereof with film engaging means such as a pair of clamping ears 30 and the opposite edges of the X-ray film 20 are slidably and preferably frictionally disposed between said inturned clamping ears.

The X-ray shield and film holder unit 10 illustrated and described herein preferably is of the type primarily adapted for periapical type X-ray techniques wherein the entire length of the tooth is X-rayed, from the occlusal surface or incisal edge thereof, to the tip of the roots thereof. This is explained to distinguish the technique from that which employs bitewing type film wherein the film is held adjacent both the upper and lower rows of teeth when in biting engagement with each other so as to commonly film both rows of teeth and, under such circumstances, only a portion of the roots of such teeth usually appear in the X-ray picture. Thus, in effecting the periapical X-ray technique, the full length or width of the film, as desired, is utilized with regard to either a single tooth or a single small group of adjacent teeth in one jaw only, as distinguished from the teeth in both jaws.

By referring particularly to FIG. 1, it will be seen that the shield and film holder unit 10 illustrated therein are disposed with the film directly in back of the teeth of the upper jaw 32 of an exemplary patient and it also will be seen that the film 20 has a height substantially equal to the entire length of the upper teeth 34. To position the film 20 in this manner, the bracket arm 26 is disposed between the lips 36 and 38 defining one end of the mouth of the patient and also between the row of upper teeth 34 and lower teeth 40. To prevent direct contact of the teeth of the patient with the rigid and preferably metallic bracket arm 26, the present invention contemplates the use of a bite-receiving block-like member 42 which, hereinafter, is sometimes referred to as a bite-block.

As indicated above, the present invention contemplates a number of different embodiments of bite-blocks respectively illustrated in the embodiment shown in FIGS. 1–4 and also in succeeding figures. Said bite-blocks may be formed inexpensively from suitable material such as various types of synthetic resins, commonly referred to as plastics and, in accordance with the preferred construction of the same, at least the opposite surface portions thereof which are engaged by the upper and lower teeth of the patient, could be compressible and/or yieldable sufficiently to provide comfort to the patient while, simultaneously, affording firm and adequate positioning of the X-ray film 20 with respect to the teeth being X-rayed.

For purposes of further affording maximum comfort to a patient while making X-ray exposures especially of the posterior or so-called jaw teeth, attention is directed to FIG. 3 which is a plan view of the X-ray shield and film holder unit 10 shown in the preceding figures. In FIG. 3 it will be seen that the bracket arm 26 has a lateral offset 44 terminating in an inner end 46 which is directly connected to the lower edge of film holder 22. The offset 44 is disposed within the oral cavity immediately adjacent the cheek adjacent the end of the patient's mouth defined by the lower and upper lips 36 and 38. By such means, it is not necessary for the patient to extensively stretch one end of his mouth substantially out of shape and thereby induce discomfort. Rather, the offset 44 effects placement of the film holder 22 laterally to one side of the main portion of the bracket arm 26 but nevertheless in direct axial alignment with the X-ray passage opening 18 in the shield 12, as readily can be seen from FIG. 3. Thus, the X-ray film 20 likewise is directly in axial alignment with the opening 18 in the X-ray shield 12, whereby the rearmost teeth in the oral cavity would be directly in the line of X-rays emitted from the cone 14 and passing through the opening 18.

In view of the offset 44 on bracket arm 26 and the arrangement of the inner end 46 of said arm, the bite-block 42 employed with said embodiment of bracket arm is substantially square in plan view as can readily be seen from FIG. 3 and an arm-receiving slot 48 is provided in two adjacent side walls of the bite-block 42, thereby providing a somewhat L-shaped slot 48 which results in a connecting portion 50 remaining in one corner of the bite-block 42 for purposes of connecting the upper portion 52 and lower portion 54 together. Especially from FIGS. 3 and 4, it will be seen that the corner portion 50 of bite-block 42 is disposed within an angular configuration defined by the offset 44 and inner end 46 of bracket arm 26 and thus serves accurately to position the bite-block 42 with respect to the bracket arm and especially the film holder 22.

The slot 48 within the bite-block 42 preferably is of such dimensions that it frictionally receives the flat strip-like bracket arm 26 in such manner as to effect operative engagement between the arm and bite-block but nevertheless permit ready separation of the bite-block from the arm when X-raying of the teeth of a patient has been completed and it is desired to prepare the X-ray shield and film holder unit 10 for the next patient, under which circumstances, said unit should be sterilized and the previously used bite-block 42 should be removed therefrom, discarded, and a new bite-block applied to the unit 10 when the same is ready for use with the next patient. Further, the location of the slot 48 within the bite-block 42 is such that when the bite-block is applied to the arm 26 in its operative position as illustrated especially in FIGS. 3 and 4, the innermost side surface 56 of bite-block 42 is disposed in abutment with the lower portion of the film holder 22, whereby the upper surface of the bite-block 42 forms a positioning stop for the lower edge of the X-ray film 20 as is best shown in FIGS. 1 and 4.

Particularly for purposes of X-raying the anterior or front teeth of a patient, the embodiment of X-ray shield and film holder unit 58 illustrated in FIGS. 5 and 6 is utilized. Particularly the cuspid or canine teeth 60 as well as the central teeth 62 of the anterior teeth are among the strongest teeth possessed by human beings and, consequently, have relatively long roots. When it is desired to X-ray substantially the entire length of such teeth, it is preferred that the unit 58 have a shield 64 which, preferably, is formed from the same material and has all of the characteristics of shield 12 of the preceding embodiment, with the exception of the opening 66 therein which, it will be seen, is rectangular but the long axis extends vertically, whereby as shown in FIG. 6, in exemplary manner, one of the central teeth 62 can be X-rayed substantially in its entirety when employing a film commensurate in size and shape with the opening 66 and supported by the film holder 68 which is connected to the inner end of bracket arm 70, the outer end of which is formed with an ear 72 provided for attachment, by spot welding or otherwise, to the X-ray shield 64 adjacent the opening 66 therein. It is to be understood that the function and basic structure of the film holder 68 and bracket arm 70 are similar to the film holder 22 and bracket arm 26 of the preceding embodiment but it will be seen that the bracket arm 70 is substantially straight and extends directly rearwardly from the X-ray shield 64, due to the fact that no offset in the arm is necessary when X-raying the front or anterior teeth of a patient.

The film 74, which is shown in exemplary manner in FIG. 5, and as indicated above, is complementary in shape and size to the X-ray passage opening 66 of the shield 64 and such film is held in operative position wth respect to the film holder 68 by ears 76 which are similar in shape and function to the ears 30 of the preceding embodiment. Also, a bite-block 78 which, in plan view, as shown in FIG. 5, is rectangular and is formed from material similar to the bite-block 42 of the preceding embodiment. Bite-block 78 is formed with a slot 80 for frictionally receiving the arm 70, said slot extending inward from one side of the bite-block and also extending for the full length of the same.

Particularly from FIG. 5, it will be seen that the bite-block 78 is relatively long. Due to the fact that the upper palate of an intra-oral cavity does not extend upwardly from the upper gum as abruptly as the tongue-accommodating space extends abruptly downward from the lower teeth and gum in the lower jaw, and due further to the fact that the embodiment of X-ray shield and film holder unit 58 shown in FIGS. 5 and 6 is intended for use to X-ray the teeth of either the upper or lower jaw of a patient, the substantial length of the bite-block 78 enables the film holder 68 and film contained therein to be disposed at different spacings, in a lateral direction inward, from the inner surfaces of either the upper or lower anterior teeth of the patient in order that the extremity of the film and film holder opposite the ends thereof disposed adjacent the bracket arm 70 may be accommodated comfortably within the oral cavity regardless of whether upper or lower teeth are being X-rayed. Referring to FIG. 7, wherein the X-ray shield and film holder unit is of the same type as unit 10 shown in the embodiment illustrated in FIGS. 1–4 and the function thereof is similar, particularly in regard to X-raying rear or posterior teeth, it will be seen that the bite-block 42 has upper and lower surfaces which are disposed at an acute angle with respect to each other, whereby the upper surface 82, which is engaged by the occlusal surfaces of the upper teeth 34 is parallel to the bracket arm 26, for purposes to be described, but the lower surface 84 of bite-block 42 is at a very acute angle to the bracket arm 26 as well as the upper surface 82 of the bite-block. By such arrangement however, it will be seen that said upper and lower surfaces 82 and 84 of the bite-block are respectively in parallelism with the general plane of the occlusal surfaces of the upper teeth 34 and lower teeth 40, thereby affording firm support for the unit 10 when the teeth engage said opposite surfaces 82 and 84 of the bite-block firmly and comfortably due to the preferably compressible nature of the bite-block 42.

Details of the bite-block 42 illustrated in FIG. 7, which is wedge-shaped, are illustrated to advantage in FIGS. 11–13.

As indicated above, the surface 82 of the bite-block 42, which is substantially parallel to the slot 48, is disposed adjacent that surface of bracket arm 26 which is nearest the bottom edge of the film holder 22, whereby the vertical and horizontal axes of the film and film holder will be in desired orientation with the teeth being X-rayed, as particularly can be visualized from FIG. 7. This is of significance particularly in regard to FIGS. 14 and 15 wherein it will be seen that the X-ray shield and film holder units 10 and 10' are shown, these being respectively right-hand and left-hand versions of the same basic type of structure. Due to the fact that the film holders 22 and 22' of said units 10 and 10' both extend upwardly from the plane of the arms 26 and 26' thereof, so as to align said film holders axially with the openings 18 and 18' respectively in the shield members 12 and 12' thereof, it can be visualized that the unit 10' can be utilized to X-ray all the upper right posterior teeth and the lower left posterior teeth, whereas the unit 10' is used to X-ray the upper left and lower right posterior teeth. Essentially, the bite-blocks 42 and 42' used respectively with the units 10 and 10' are the same as those illustrated in the preceding embodiments with the exception of the embodiment of FIGS. 5 and 6. Hence, a minimized amount of units is capable of expeditiously X-raying all of the posterior teeth of a patient, whereas only a single embodiment of X-ray shield and film holder unit 58 of the type shown in FIGS. 5 and 6 is required for purposes of filming all requirements of X-raying the anterior teeth of a patient.

It is to be understood that the foregoing descriptions and illustrations of the several principal types of X-ray shield and film holder units illustrated and described hereinabove primarily are for purposes of setting forth structural characteristics, details and functions. To provide a full complement of operative units of the type referred to, it is conceivable that various sizes of the different units may be required, particularly for purposes of X-raying the teeth of children as compared with the teeth of adults. However, for practical purposes, a set of three instruments, comprising a left-hand and right-hand offset arm type and a straight arm type, all sizes suitable for use on adults, and a similar set of three instruments of smaller size for use on children is sufficient for accomplishing substantially all types of dental X-ray activities normally undertaken in a dental operatory.

By further reference to FIGS. 14 and 15 particularly, wherein the offsets 44 and 44′ extend rearwardly respectively from the bracket arms 26 and 26′, toward the condyle of the lower jaw, it will be seen that the disposition of the slotted portions of the bite-blocks 42 and 42′ are rearwardly toward said condyle and laterally outwardly toward the cheek of the patient, whereby there is no possibility of the bite-blocks becoming accidentally dislodged from the bracket arms 26 and 26′ in a rearward direction, wherein the construction provides safety against possible disconnection of the bite-blocks in such a manner that swallowing thereof might occur.

By reference particularly to FIGS. 8–10, a slightly different embodiment of the version of bite-block employed preferably with a straight bracket arm is shown, said arm being of the type utilized in the X-ray shield and film holder unit 58 illustrated in FIGS. 5 and 6. This embodiment of unit 58 preferably is intended primarily for X-raying the forward or anterior teeth of a patient, whereby such anterior upper exemplary central tooth 62 and lower exemplary central tooth 62′ are illustrated in FIG. 8, and the instrument is arranged with the film holder 68 extending downwardly for purposes of X-raying the lower central tooth 62′.

The bite-block 86, in plan view, is substantially rectangular and also is noticeably longer than it is wide as clearly shown in FIGS. 9 and 10. The slot 88 which extends laterally inward from one side of said bite-block and also is coextensive in length with the longitudinal axis of the bite-block 86, slidably and frictionally receives the innermost portion of the bracket arm 70, whereby the surface of the bite-block nearest the edge of the X-ray film 74 which is disposed closest to the bracket arm 70 will be abutted by said edge of the film and therefore the bite-block serves as a stop for suitable positioning the X-ray film relative to the holder 68.

Further, it will be seen that the slot 88 is disposed closer to one bite-receiving surface of the bite-block 86 than the other, thereby providing the bite-block with a thick portion 90 and a thin portion 92. It thus will be seen that either the thick or the thin portions 90 and 92 of the bite-block selectively may be disposed adjacent the surface of the bracket arm 70 from which the film holder 68 extends so as to accommodate the X-ray shield and film holder unit to best advantage with respect to any individual patient in regard to whether the patient has a deep or shallow palate. Also, the appreciable length of the block 86 permits the placing of the film holder 68 at the most comfortable location, laterally and rearwardly with respect to the teeth being X-rayed, also for purposes of accommodating the unit in the most comfortable manner to any individual patient in view of the depth of the palate of said patient while still permitting the accurate positioning of the X-ray film so as to obtain X-ray images of substantially the entire length of the teeth.

From FIG. 8 particularly, it also will be seen the provision of a metallic film holder such as holder 68, which extends substantially coextensively with the area of the X-ray film 74, acts as a shield to prevent the direct passage of X-rays which have been utilized to X-ray the desired teeth, from passing into other tissue or anatomical portions of the interior of the mouth, such as the patient's tongue 94. This characteristic of the various film holders described in the foregoing embodiments also serves in the same shielding capacity for such organs and portions of the anatomy within the oral cavity.

From the foregoing, it will be seen that the present invention provides relatively inexpensive and therefore expendable bite-blocks of different types respectively intended for different purposes and functions and capable of use in conjunction with several different types of X-ray shield and film holder units so as to provide maximum comfort and safety to a patient incident to said units being employed for purposes of making X-ray images of desired teeth of the patient, particularly in making periapical X-rays. By forming such bite-blocks so as to be of an inexpensive and expendable nature, sterilization of the shield and film holder units is enhanced and certain characteristics embodied in the various types of bite-blocks enable the dentist to effect maximum accuracy and efficiency in making X-ray pictures of desired teeth.

While the invention has been described and illustrated in its several preferred embodiments, it should be understood that the invention is not to be limited to the precise details herein illustrated and described since the same may be carried out in other ways falling within the scope of the invention as claimed.

I claim:

1. A dental X-ray shield and film holder unit comprising in combination, a plate-like X-ray shield arranged to be positioned exteriorly of the face of a patient adjacent the outer end of the cone of an X-ray machine and having an opening of restricted size extending substantially centrally therethrough and being of similar shape and area to that of an X-ray film to be used in the mouth of a patient, a flat strip-like bracket arm formed from rigid sheet material having an attaching ear bent perpendicularly to said arm at one end thereof and connected to one face of said shield adjacent said opening, said arm extending substantially perpendicularly from said one face of said shield, film-holding means attached to and extending substantially perpendicularly from one flat face of the opposite end of said bracket arm and having means to receive an X-ray film and support the same within the mouth of a patient substantially parallel to said shield adjacent the lingual or palatal wall of one of the gums when the bracket arm extends to the oral cavity past the teeth, and a block-like bite-receiving member having opposite outer surfaces respectively formed from yieldable material non-injurious to teeth and engageable by the teeth of the opposite jaws of a patient, said member having a longitudinal slot extending inward from one side of the member for the full length thereof substantially in parallelism with at least one of said outer surfaces and closer to one of said surfaces than the other to provide relatively thick and thin spacing portions between the opposite surfaces of said bracket arm and the outer surfaces of said bite-receiving member to permit reversal of said member on said arm and thereby provide different spacings of said arm and film held thereby relative to shallow and deep palates of patients, said slot being snugly complementary to the thickness of said bracket arm to frictionally receive the same closely adjacent said film holding means and in engagement with an X-ray film when supported by said holding means to position the edges of said film nearest said bracket arm in predetermined relationship to said bracket arm of said unit, thereby to firmly support the bracket arm between said opposing teeth of a patient and thus position said X-ray shield exteriorly of a patient's face as aforesaid with the opening therein in axial alignment with an X-ray film when placed within said film holding means and supported thereby within the oral cavity of a patient.

2. The dental X-ray shield and film holder unit according to claim 1 in which said outer surfaces of said bite-receiving member diverge at an acute angle to render the member wedge-shaped, whereby said opposed surfaces diverge complementarily to the disposition of the rows of teeth of the opposite jaws of a patient when said rows are partially spaced to accommodate said bracket arm and bite-receiving means therebetween, the apex of said angle between said outer diverging surfaces being disposed innermost toward the condyle of the patient when in use.

3. The dental X-ray shield and film holder unit according to claim 1 in which said bracket arm has a lateral offset within the plane thereof adjacent the end to which the film-holding means is connected to accommodate one side of a patient's mouth and the block-like bite-receiving member has four sides disposed substantially at right-angles to each other and the slot formed in said bite-receiving member having a lateral extension within the plane of the slot extending through the opposite side of the member to provide in one corner of the member a connecting portion extending between the upper and lower portions of the member to connect the same together, said slot being L-shaped in plan view to accommodate portions of said bracket arm and said offset therein, thereby to position said bite-receiving member accurately upon said arm adjacent said film-holding means.

4. A block-like bite member arranged to be detachably connected to a rigid and flat strip-like bracket arm of an X-ray shield and film holder unit for supporting an X-ray film within the oral cavity by means of said bracket arm extending between the opposite jaws of a patient, said bite member being block-like and formed from non-metallic yieldable and compressible material and having opposed outer surfaces respectively engageable by opposing teeth of the opposite jaws of a patient and said member having a thin slot extending inwardly from one side edge of said bite member for the full length thereof and being substantially parallel to at least one of said opposed surfaces, said slot being snugly complementary to said flat bracket arm and the material of said member providing frictional engagement therewith when attached thereto to position said member operably upon said bracket arm, said slot also being closer to one of said opposing surfaces than the other to provide relatively thick and thin portions selectively disposable adjacent the opposite surfaces of said bracket arm to provide different spacings of a film holder on said arm effectively relative to shallow and deep palates of a patient and the opposite outer surfaces of said member diverging at an acute angle to each other so as to be complementary to opposing rows of teeth of a patient when said teeth are separated sufficiently to receive said bite member therebetween.

5. The bite member according to claim 4 in which the same is substantially square and said slot extends inwardly from two adjacent transversely extending sides of said member partially toward the opposite sides to provide a substantially L-shaped slot in plan view and providing a connecting portion in one corner of said bite member to permit positioning said connecting portion of said bite member relative to offset portions of a bracket arm when connected thereto to effect operative positioning of said bite member on said bracket arm.

References Cited by the Examiner
UNITED STATES PATENTS

| | | | |
|---|---|---|---|
| 1,445,169 | 2/1923 | Ralph | 250—70 |
| 2,021,190 | 11/1935 | Maikasian | 250—70 |
| 2,736,814 | 2/1956 | Lederman et al. | 250—70 |
| 3,003,062 | 10/1961 | Updegrave | 250—70 |
| 3,092,721 | 6/1963 | Medwedeff et al. | 250—70 |

RALPH G. NILSON, *Primary Examiner.*

A. L. BIRCH, *Assistant Examiner.*